United States Patent
Tran et al.

(10) Patent No.: US 9,390,847 B1
(45) Date of Patent: Jul. 12, 2016

(54) SYSTEM AND METHOD FOR ELECTROMAGNETIC-BASED PROPULSION

(71) Applicant: The United States of America as represented by the Secretary of the Navy, Washington, DC (US)

(72) Inventors: Nghia X. Tran, San Diego, CA (US); Hoa V. Phan, San Diego, CA (US); Anhtuan T. Ton, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 1 day.

(21) Appl. No.: 14/626,060

(22) Filed: Feb. 19, 2015

(51) Int. Cl.
*H01H 47/00* (2006.01)
*H01F 3/10* (2006.01)
*B62D 57/02* (2006.01)
*B63H 5/02* (2006.01)
*B63H 19/00* (2006.01)

(52) U.S. Cl.
CPC ........ *H01F 3/10* (2013.01); *B62D 57/02* (2013.01); *B63H 5/02* (2013.01); *B63H 19/00* (2013.01)

(58) Field of Classification Search
CPC .......................................................... H01F 3/10
USPC .......................................................... 361/143
See application file for complete search history.

(56) References Cited

U.S. PATENT DOCUMENTS

| 4,774,440 A | * | 9/1988 | Bhadra | ............... B07B 1/42 310/81 |
| 6,227,933 B1 | * | 5/2001 | Michaud | ........... A63H 33/005 446/458 |
| 7,214,427 B2 | | 5/2007 | Huang et al. | |
| 8,269,447 B2 | * | 9/2012 | Smoot | ............... B62K 1/00 180/24.01 |
| 8,316,970 B1 | | 11/2012 | Tran | |
| 8,662,213 B2 | | 3/2014 | Bradley | |
| 8,672,062 B2 | * | 3/2014 | Schroll | ................ B62D 57/02 180/7.1 |
| 8,788,130 B1 | | 7/2014 | Tran et al. | |

* cited by examiner

*Primary Examiner* — Stephen W Jackson
(74) *Attorney, Agent, or Firm* — SPAWAR Systems Center Pacific; Kyle Eppele; Ryan J. Friedl (57) ABSTRACT

A system and method may include energizing one or more of a plurality of electromagnets contained within and fixedly distributed about a first region of a structure and de-energizing other of the electromagnets to attract a substance contained and movable within a second region of the structure to the energized electromagnets and change the center of gravity of the structure. The structure may be disposed on a surface or within a liquid, where energizing and de-energizing of the electromagnets causes the structure to move about the surface or within the liquid in a desired fashion. The substance may be a magnetic or magnetizable substance. Energizing and de-energizing the electromagnets may be performed by a controller responsive to a signal received from a sensor or transceiver.

18 Claims, 8 Drawing Sheets

SYSTEM AND METHOD FOR ELECTROMAGNETIC-BASED PROPULSION

FEDERALLY-SPONSORED RESEARCH AND DEVELOPMENT

The System and Method for Electromagnetic-Based Propulsion is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 102522.

BACKGROUND

A system and method are needed for providing propulsion for objects, such as a robot, that do not require moving mechanical parts that are subject to wear and failure.

DETAILED DESCRIPTION OF SOME EMBODIMENTS

Figure 1A:
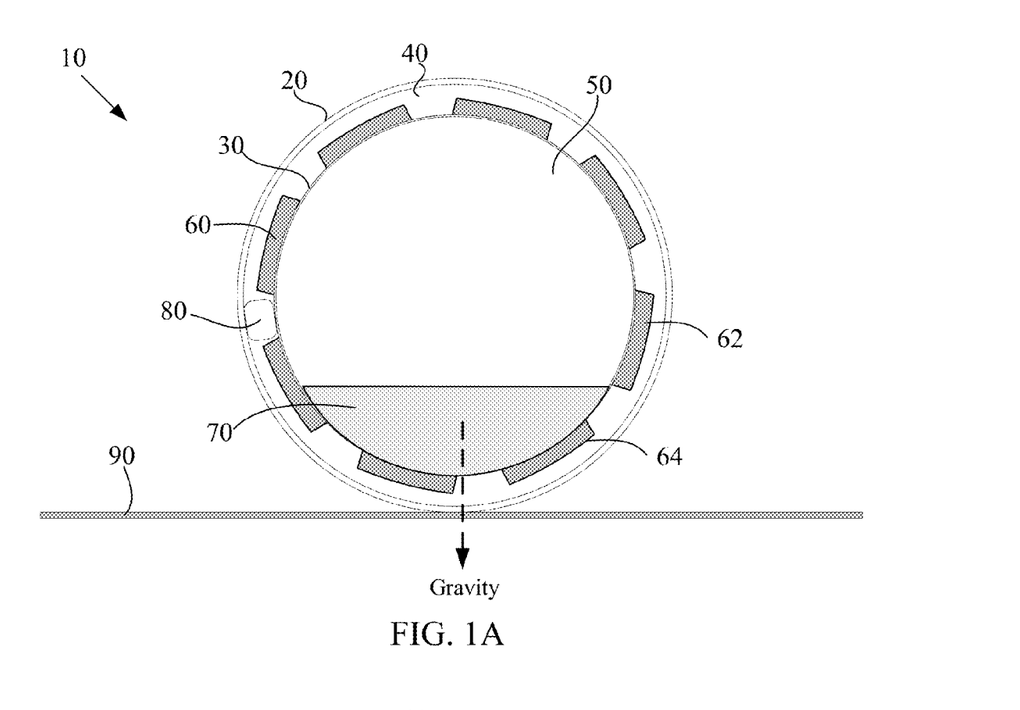
FIGS. 1A and 1B show cross-section views of an embodiment of a system in accordance with the System and Method for Electromagnetic-Based Propulsion.
Figure 1B:
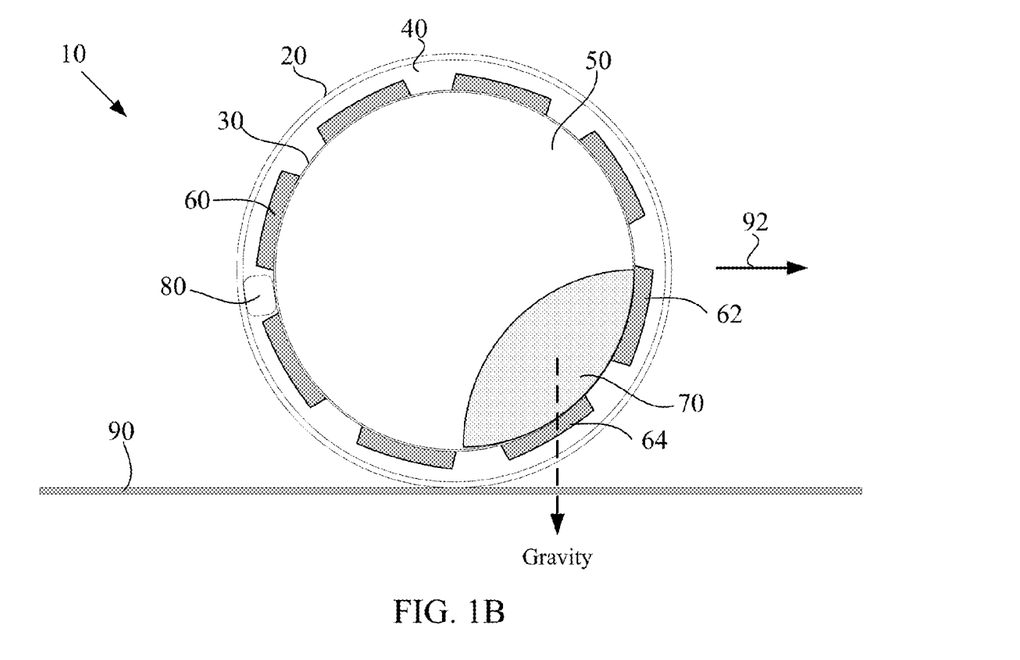

FIGS. 1A and 1B show cross-section views of an embodiment of a system 10 on a surface 90 in accordance with the System and Method for Electromagnetic-Based Propulsion. System 10 may include a structure comprising an outer shell 20 and an inner shell 30. In some embodiments, as shown, the structure is spherical. However, the structure may comprise other shapes such as rectangular, square, trapezoidal, or any other shape depending upon design requirements and application. In some embodiments, outer shell and inner shell comprise a rigid material, while in other embodiments they comprise a non-rigid material. As an example, outer shell 20 comprises a lightweight and durable material, such as a polymer-based material. In some embodiments, outer shell 20 is watertight, allowing system 10 to operate in water.

The space between outer shell 20 and inner shell 30 defines a first region 40 and the space within inner shell 30 defines a second region 50. In other embodiments however, first region 40 and second region 50 may not be physically separated and may instead be different areas of the same undivided space. A plurality of electromagnets 60 are contained within and fixedly distributed about first region 40. As shown, electromagnets 60 are coupled to inner shell 30. However, electromagnets 60 may be coupled to outer shell 20 or otherwise fixedly distributed about first region 50. In some embodiments, electromagnets 60 are distributed all about first region 50, as shown, while in other embodiments electromagnets may be distributed about a portion of first region 50 or distributed in groups about first region 50.

A substance 70 is contained and movable within second region 50. Substance 70 is configured to be attracted to electromagnets 60 when electromagnets 60 are energized. As an example, substance 70 may comprise a liquid form, such as a ferrite liquid, or a solid form, such as a ferrite sphere, or a powder form, such as ferrite powder. If in liquid form, the amount of substance 70 contained within second region 50 may vary, so long as the amount of liquid contained within second region 50 is sufficient to cause system 10 to roll or otherwise move about a surface when the center of gravity changes.

As an example, substance 70 is a magnetic substance or a magnetizable substance. As used herein, the term "magnetic substance" refers to any substance that has the properties of a magnet, pertaining to a magnet, or to magnetism, producing, caused by, or operating by means of, magnetism. As used herein, the term "magnetizable substance" refers to any substance that has the property of being interacted with the field of a magnet, and hence, when suspended or placed freely in a magnetic field, of inducing magnetization and producing a magnetic moment.

Examples of magnetizable substances include, but are not limited to, paramagnetic, ferromagnetic, and ferrimagnetic substances. As used herein, "paramagnetic substance" refers to the substances where the individual atoms, ions or molecules possess a permanent magnetic dipole moment. In the absence of an external magnetic field, the atomic dipoles point in random directions and there is no resultant magnetization of the substances as a whole in any direction. As used herein, "ferromagnetic substance" refers to the substances that are distinguished by very large (positive) values of susceptibility, and are dependent on the applied magnetic field strength. As used herein, "ferrimagnetic substance" refers to the substances that show spontaneous magnetization, remanence, and other properties similar to ordinary ferromagnetic materials, but the spontaneous moment does not correspond to the value expected for full parallel alignment of the (magnetic) dipoles in the substance.

Figure 2:
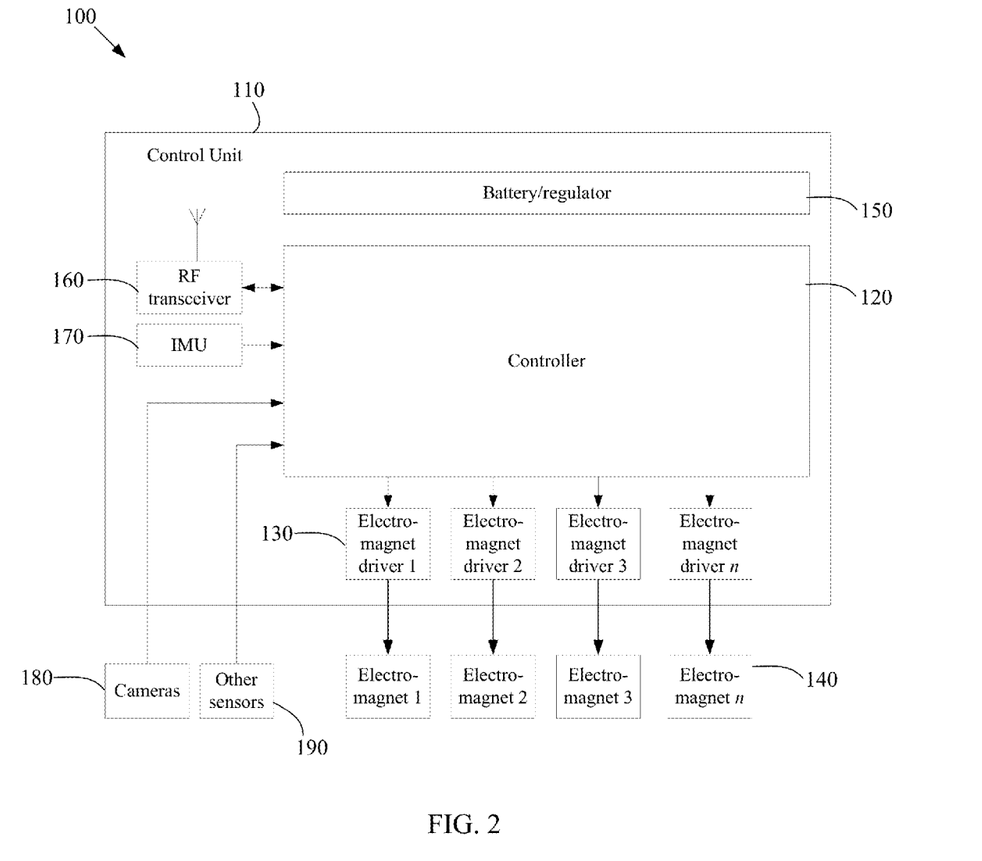
FIG. 2 shows a component diagram of an embodiment of a system in accordance with the System and Method for Electromagnetic-Based Propulsion.

In some embodiments, a controller, such as controller 120 shown in FIG. 2, is operatively coupled to each of electromagnets 60. As an example, the controller is contained within a control unit 80, which in some embodiments may be configured similarly as control unit 110 shown in FIG. 2, which may be secured by fasteners and/or brackets to either of both of outer shell 20 and inner shell 30. As another example, the control unit may be held in place by pressure from both outer shell 20 and inner shell 30. In one embodiment, the controller is wired in parallel to each of electromagnets 60. In another embodiment, the controller is wired serially to each of electromagnets 60. In one embodiment, the controller is connected to a power supply (not shown), which may be contained within the same control unit 80 as the controller (see FIG. 2) or located adjacent thereto.

The controller is configured to energize one or more of electromagnets 60 and de-energize one or more other of electromagnets 60 to attract substance 70 to the energized electromagnets 60 and change the center of gravity of the structure. For example, in FIG. 1A electromagnets 62 and 64 are not energized and substance 70, which is shown as a liquid, has a center of gravity at a first location. When electromagnets 62 and 64 are energized by the controller, as shown in FIG. 1B, substance 70 is attracted to electromagnets 62 and 64 and the center of gravity of the structure shifts rightward to a second location, causing the structure to move along surface 90 in the direction shown by arrow 92. Electromagnets 60 can be energized and de-energized abruptly or gradually, causing system 10 to move with any desired acceleration.

In embodiments where at least one sensor is operatively connected to the controller, the controller is configured to energize and de-energize electromagnets 60 in response to a signal received from the sensor. In embodiments where a transceiver is operatively connected to the controller, the controller is configured to energize and de-energize electromagnets 60 in response to a signal received from the transceiver.

In some embodiments, system 10 may include, in addition to a battery, an energy harvesting system therein (not shown), such that energy is harvested from system 10 as system 10 moves along surface 90. As an example, the energy harvesting system may be a vibration-based micro-electrical-mechanical-based energy harvesting system. In such embodiments, system 10 may be able to generate a sufficient amount of energy that can be used to power the controller and electromagnets 60 to provide a substantially self-powered system.

System 10, as well as systems 200, 300, 400, 500, and 600 as shown and described herein, may be manufactured in various sizes depending upon the desired application. For example, if system 10 is to be used as a projectile that can be launched from a canon or thrown by a user, system 10 would be designed to be about the size of a softball. If system 10 is to be used for applications where it is not required for it to be readily user-transportable, system 10 may be designed with the radius of, for example, an automobile tire.

FIG. 2 shows a component diagram of an embodiment of a system 100 in accordance with the System and Method for Electromagnetic-Based Propulsion. As an example, system 100 may be used in system 10 or any other system embodiment shown or discussed herein, such as systems 200, 300, 400, 500, and 600. System 100 includes a control unit 110 housing a controller 120, which is operatively connected to electromagnet drivers 1 to n 130, which are each respectively connected to electromagnets 1 to n 140. The control unit further includes a battery/regulator 150, an RF transceiver 160, inertial measurement unit (IMU) 170, cameras 180, and other sensors 190, each connected to controller 120.

In some embodiments, battery/regulator 150 contains a battery charging circuit. The battery can be charged via wired or wireless power transfer. An induced charging circuit allows for charging the battery wirelessly without opening up, for example, outer shell 20. In some embodiments, the battery contains an energy harvesting unit. As an example, a solar panel converts sunlight to electricity, providing electric power for the system to operate.

As an example, IMU 170 may be any one or a combination of a GPS, an accelerometer, gyroscope, and magnetometer for providing position, speed, direction, inertia, and/or orientation for a system, such as system 100. Other sensors or components that are typically found in portable and controllable objects, such as robots, may be added to system 100 as recognized by one having ordinary skill in the art, with the appropriate modifications made to the software within the controller, power supply, etc. As an example, sensors 190 may comprise sensors such as a chemical/biochemical sensor, ambient sensor, or other sensors as are typically found on portable and controllable objects, such as robots, for particular applications or as recognized by one having ordinary skill in the art.

Figure 3A:
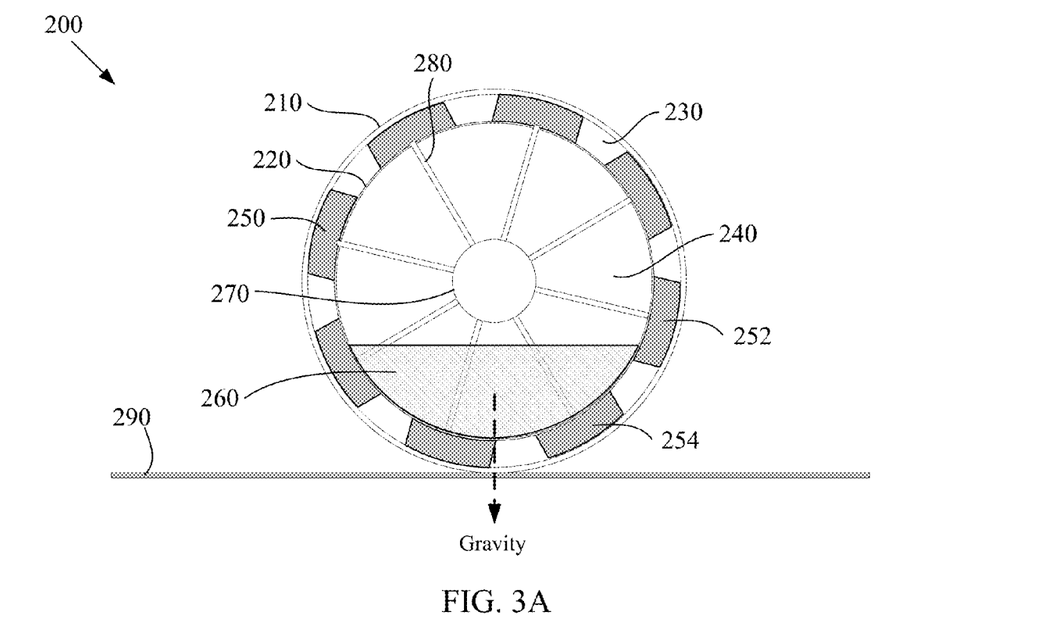
FIGS. 3A and 3B show cross-section views of an embodiment of a system having a hub and spoke configuration in accordance with the System and Method for Electromagnetic-Based Propulsion.
Figure 3B:
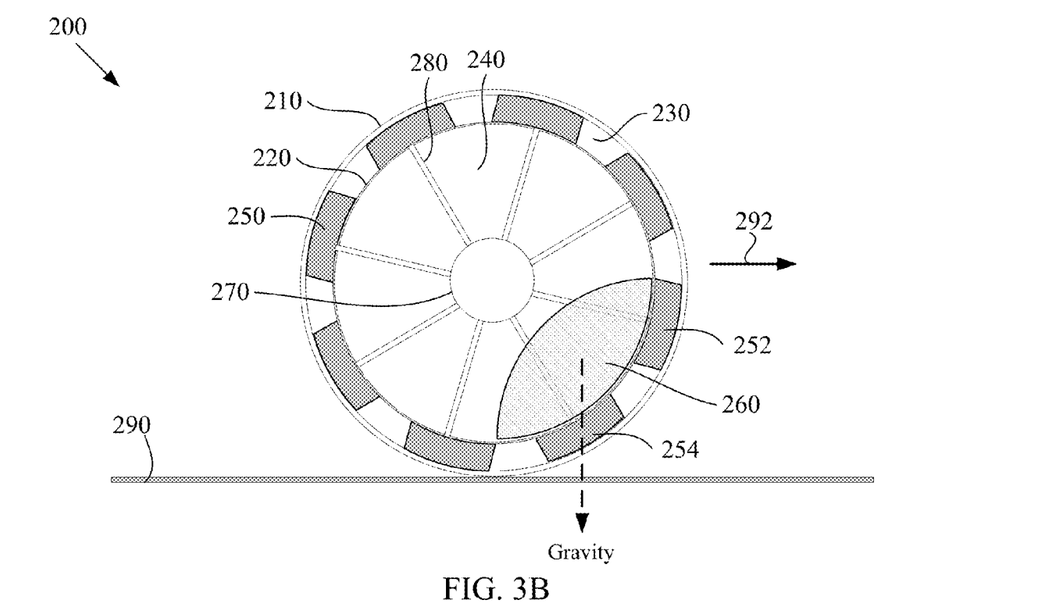

FIGS. 3A and 3B show cross-section views of an embodiment of a system 200 having a hub and spoke configuration in accordance with the System and Method for Electromagnetic-Based Propulsion. Components of system 200 having the same name as components of system 10 may be similarly configured. System 200 includes a structure comprising an outer shell 210 and an inner shell 220. The space between outer shell 210 and inner shell 220 defines a first region 230 and the space within inner shell 220 defines a second region 240. A plurality of electromagnets 250 are contained within and fixedly distributed about first region 230. A substance 260 is contained and movable within second region 240. Substance 260 is configured to be attracted to electromagnets 250 when electromagnets 250 are energized.

A controller (not shown) is located within control shell 270 and is operatively coupled to each of electromagnets 250. Control shell 270 is secured within second region 240 via spokes 280 connected between control shell 270 and inner shell 220. In some embodiments, spokes 280 are hollow, allowing wires to be connected from the controller within control shell 270 to the individual electromagnets 250 through spokes 280. Similar to system 10, the controller is configured to energize one or more of electromagnets 250 and de-energize one or more other of electromagnets 250 to attract substance 260 to the energized electromagnets 250 and change the center of gravity of the structure.

For example, in FIG. 3A electromagnets 252 and 254 are not energized and substance 260, which is shown as a liquid, has a center of gravity at a first location as shown by the arrow. When electromagnets 252 and 254 are energized by the controller, as shown in FIG. 3B, substance 260 is attracted to electromagnets 252 and 254 and the center of gravity of the structure shifts rightward to a second location as shown by the arrow, causing the structure to move along surface 290 in the direction as shown by arrow 292.

Figure 4:
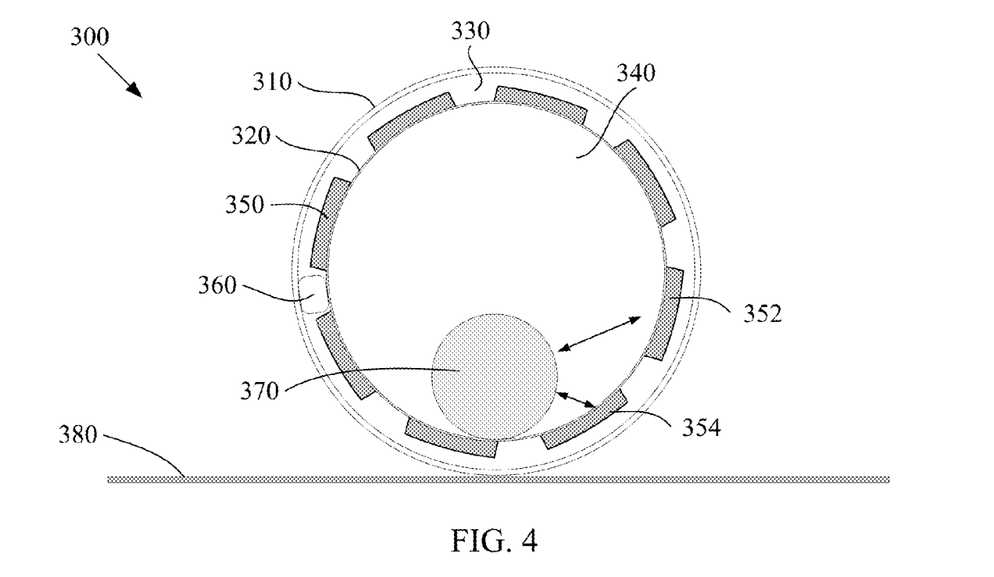
FIG. 4 shows a cross-section view of an embodiment of a system using a rolling ball in accordance with the System and Method for Electromagnetic-Based Propulsion.

FIG. 4 shows a cross-section view of an embodiment of a system 300 using a rolling ball in accordance with the System and Method for Electromagnetic-Based Propulsion. Components of system 300 having the same name as components of system 10 and/or 200 may be similarly configured. System 300 includes a structure comprising an outer shell 310 and an inner shell 320. The space between outer shell 310 and inner shell 320 defines a first region 330 and the space within inner shell 320 defines a second region 340. A plurality of electromagnets 350 are contained within and fixedly distributed about first region 330. A controller, such as controller 120 shown in FIG. 2, is operatively coupled to each of electromagnets 350. As an example, the controller is contained within a control unit 360, which in some embodiments may be configured similarly as control unit 110 shown in FIG. 2

A substance 370 is contained and movable within second region 340. As shown, substance 370 is in the form of a ball. As an example, the ball may be solid and may comprise only substance 370. As another example, the ball may be hollow and substance 370 may comprise the outer shell or material of the ball. Substance 370 is configured to be attracted to electromagnets 350 when electromagnets 350 are energized. For example, when electromagnets 352 and 354 are energized, the ball is attracted to and rolls towards electromagnets 352 and 354, changing the center of gravity of system 300 and causing system 300 to roll across surface 380 to the right. Selectively energizing and de-energizing other electromagnets 350 can cause system 300 to roll in any desired direction or to stop motion of system 300.

Figure 5:
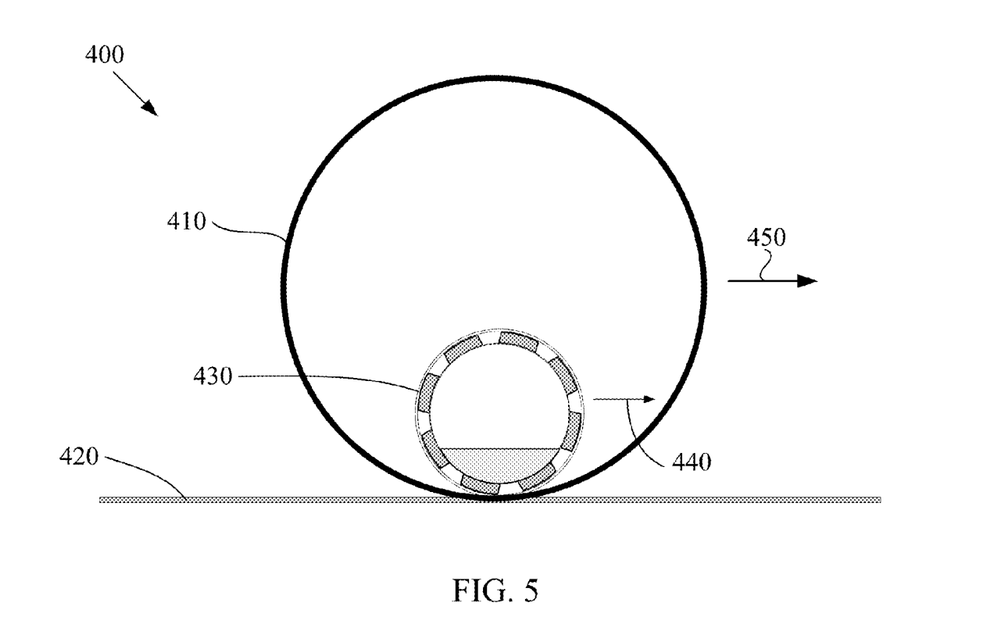
FIG. 5 shows a cross-section view of an embodiment of a system contained within a shell in accordance with the System and Method for Electromagnetic-Based Propulsion.

FIG. 5 shows a cross-section view of an embodiment of a system 400 contained within a shell in accordance with the System and Method for Electromagnetic-Based Propulsion. System 400 includes a shell 410 disposed on a surface 420. In some embodiments, shell 410 comprises a rigid material such as a polymer or metal. Shell 410 encloses a system 430, which may be configured the same as or similar to systems 10, 200, or 300 shown and discussed herein. As shown, system 430 is configured similarly to system 10 shown in FIG. 1. In some embodiments, shell 410 is a hollow ferrite shell. In some embodiments, shell 410 has a diameter at least twice the size of the diameter of the rigid spherical structure of system 430.

In operation, when system 430 rolls in the direction of arrow 440 due to electromagnets being energized to attract the substance to the electromagnets to change the center of gravity of system 430, the center of gravity of shell 410 changes, causing system 400 to roll across surface 420 in the direction of arrow 450. Selectively energizing and de-energizing other of electromagnets within system 430 can cause system 430, hence system 400, to roll in any desired direction or to stop motion of system 400.

Figure 6A:
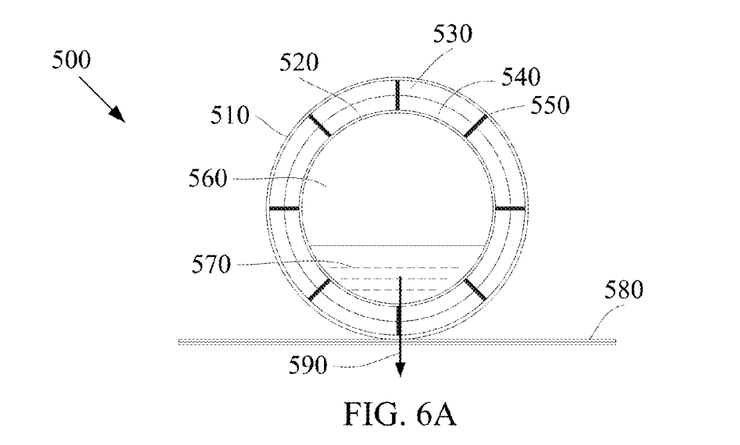
FIGS. 6A-6C show cross-section views of the operation of an embodiment of a system using two layers of electromagnets in accordance with the System and Method for Electromagnetic-Based Propulsion.
Figure 6B:
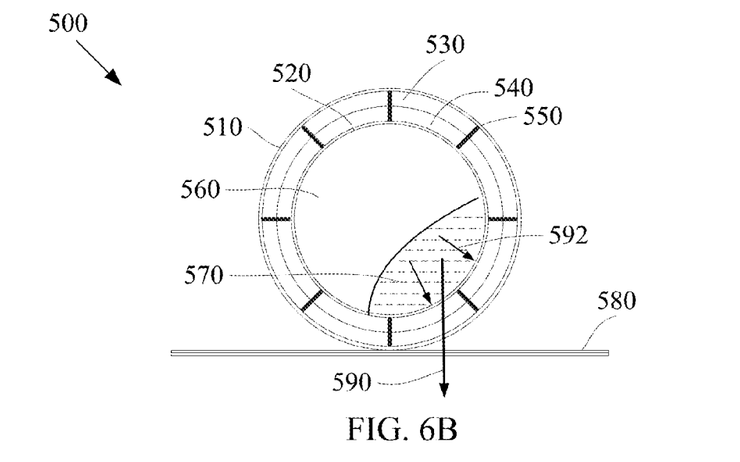
Figure 6C:
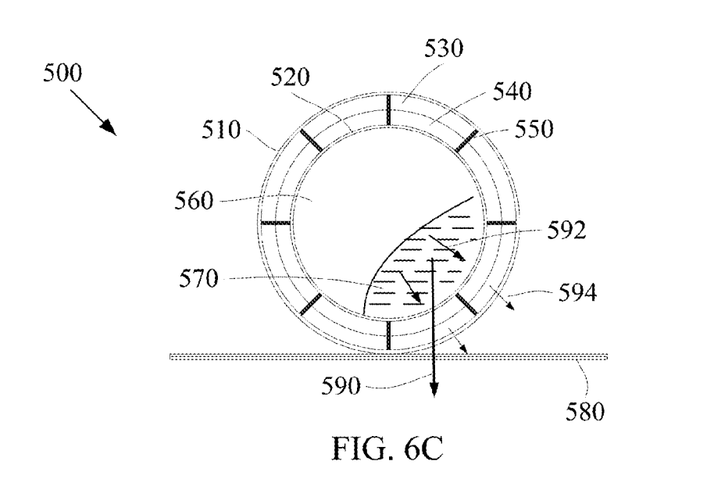

FIGS. 6A-6C show cross-section views of the operation of an embodiment of a system 500 using two layers of electromagnets in accordance with the System and Method for Electromagnetic-Based Propulsion. Components of system 500 having the same name as components of system 10, 200, 300 and/or 400 may be similarly configured. System 500 includes a structure comprising an outer shell 510 and an inner shell 520. The space between outer shell 510 and inner shell 520 defines a first region and the space within inner shell 520 defines a second region 560. A plurality of electromagnets are contained within and fixedly distributed about the first region. In some embodiments, and as shown, the plurality of electromagnets comprise a first group of electromagnets 530 coupled to outer shell 510 and a second group of electromagnets 540 coupled to inner shell 520. In some embodiments electromagnets 530 and 540 are in contact, while in other embodiments they are separated by a distance dependent upon the size of outer shell 510 and inner shell 520.

A controller (not shown) is also disposed within the first region. A substance 570 is contained and movable within second region 560. As shown, substance 570 is in the form of a liquid, but is not so limited. Substance 570 is configured to be attracted to electromagnets 540 when electromagnets 540 are energized, thus changing the center of gravity (shown by arrow 590) of system 500.

In operation, as shown in FIG. 6B, two of electromagnets 540 are energized in the bottom right quadrant of system 500, causing substance 570 to be attracted thereto as shown by arrows 592. The change in the center of gravity of system 500, shown by arrow 590, causes system 500 to roll across surface 580 to the right. As an example, surface 580 may be a non-magnetic surface. As shown in FIG. 6C, surface 580 either comprises a magnetic or magnetizable material. In addition to two of electromagnets 540 being energized, two of electromagnets 530 are also energized to provide an attraction to surface 580 as shown by arrows 594. As shown, the electromagnets 530 energized are the electromagnets immediately adjacent to those electromagnets 540 that are energized (i.e. bottom right quadrant of system 500). The use of two sets of electromagnets provides for greater attraction capabilities for systems disposed on a surface comprising a magnetic or magnetizable material.

Figure 7A:
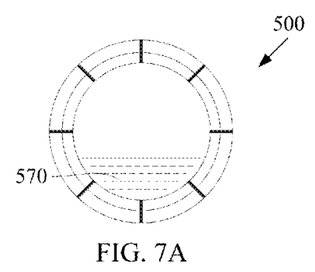
FIGS. 7A-7I show cross-section views of the movement of a liquid substance during operation of an embodiment of a system using two layers of electromagnets in accordance with the System and Method for Electromagnetic-Based Propulsion.
Figure 7B:
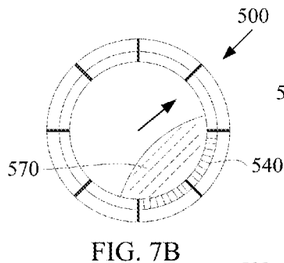
Figure 7C:
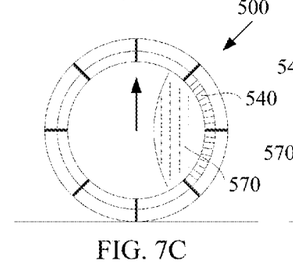
Figures 7D, 7H:
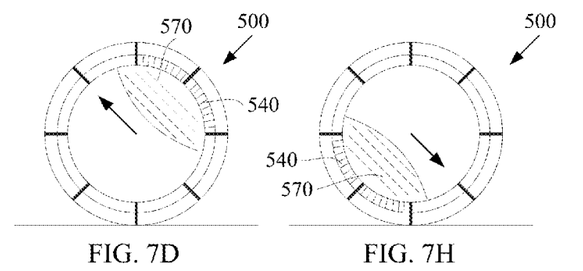
Figure 7E:
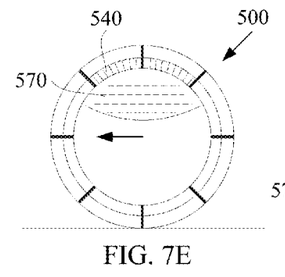
Figure 7F:
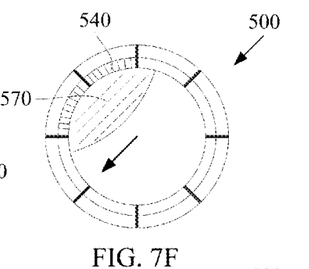
Figure 7G:
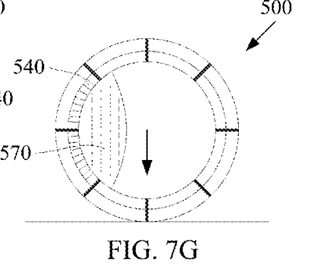
Figure 7I:
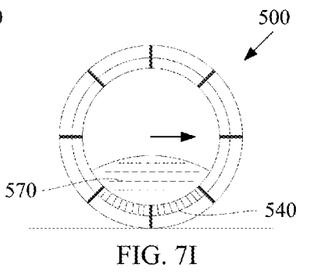

FIGS. 7A-7I show cross-section views of the movement of a liquid substance during operation of an embodiment of a system, such as system 500. As shown in FIG. 7A, none of the electromagnets in system 500 are energized. In FIG. 7B, two of electromagnets 540 are energized (as noted by the shading), causing the liquid substance 570 to be attracted thereto. The arrow shown indicates the direction of rotation of the energized electromagnets. FIGS. 7C-7I illustrate the movement of liquid substance 570 at each interval during a counter-clockwise rotation. Rapidly energizing electromagnets 540 in a sequence like that shown by the arrows in FIGS. 7B-7I causes the rapid movement of substance 570 in the various directions, which causes system 500 to vibrate. Other sequences of rapid movement of liquid substance 570 may cause other movement of system 500, such as oscillation or other movements as recognized by one having ordinary skill in the art.

Figure 8A:
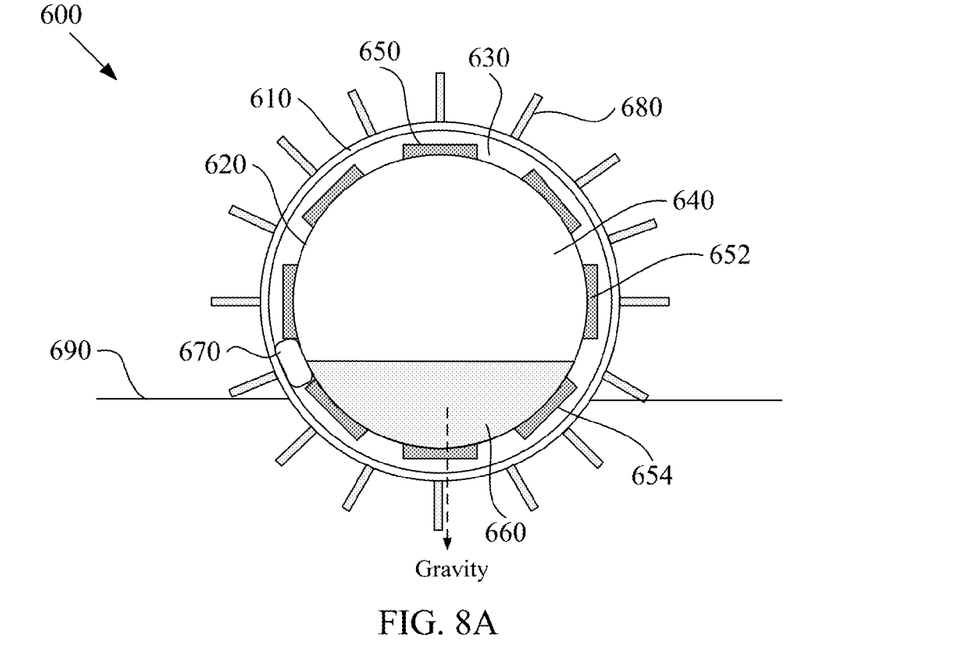
FIGS. 8A and 8B show cross-section views of an embodiment of a system 600 configured for operation in a liquid accordance with the System and Method for Electromagnetic-Based Propulsion.
Figure 8B:
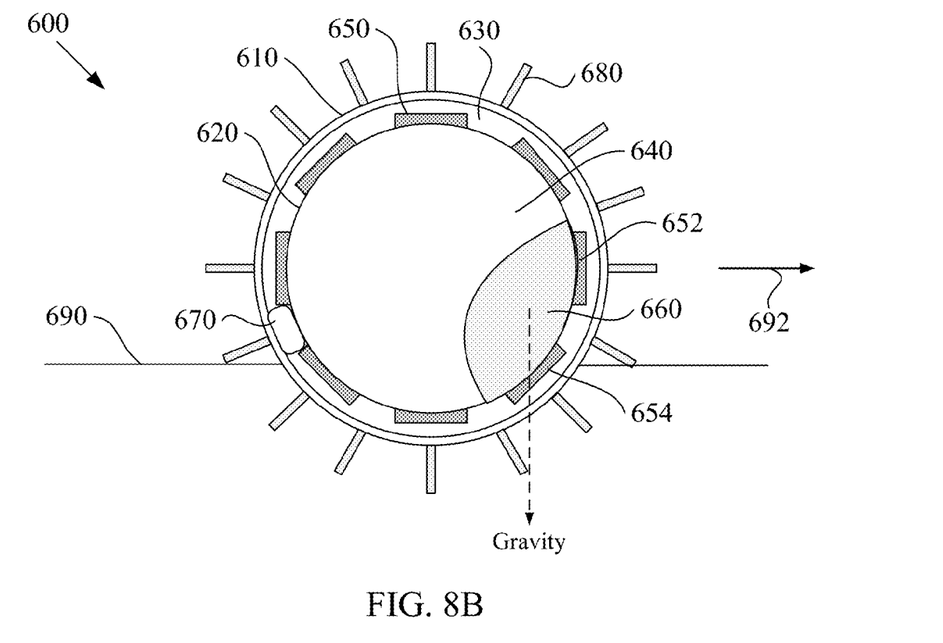

FIGS. 8A and 8B show cross-section views of an embodiment of a system 600 configured for operation in a liquid 690 accordance with the System and Method for Electromagnetic-Based Propulsion. Components of system 600 having the same name as components of system 10 or any other system disclosed herein, may be similarly configured. System 600 includes a structure comprising an outer shell 610 and an inner shell 620. In some embodiments, outer shell 610 is rigid. In some embodiments, outer shell 610 comprises a semi-rigid material. In some embodiments the shape of outer shell 610 and inner shell 620 is spherical, while in other embodiments outer shell 610 and inner shell 620 may comprise other shapes that allow for movement along a surface or within a fluid as recognized by one having ordinary skill in the art.

The space between outer shell 610 and inner shell 620 defines a first region 630 and the space within inner shell 620 defines a second region 640. A plurality of electromagnets 650 are contained within and fixedly distributed about first region 630. A substance 660 is contained and movable within second region 640. Substance 660 is configured to be attracted to electromagnets 650 when electromagnets 650 are energized. A controller, such as controller 120 shown in FIG. 2, is operatively coupled to each of electromagnets 650 and may be contained within a control unit 670, such as control unit 110 shown in FIG. 2.

More than one paddles 680 extend from the surface of outer shell 610. In some embodiments, a plurality of paddles 680 extend from the surface of outer shell 610. The number of paddles 680 extending from outer shell 610 may vary depending on the size of system 600, the size of paddles 680, and/or the particular user-specified application. In some embodiments, paddles 680 are uniformly distributed about outer shell 610. In some embodiments, paddles 680 are contained solely on certain areas of outer shell 610.

In some embodiments, paddles 680 are secured, either permanently or removably, to outer shell 610. In some embodiments, paddles 680 are integrated within outer shell 610 such that they form part of outer shell 610. Paddles 680 may comprise any size, shape, or material as may be suitable for particular applications. As an example, paddles 680 may comprise the same material as outer shell 680 and may be curved in shape to facilitate their displacement of liquid 690. As an example, liquid 690 may comprise water, but may also comprise any other type of liquid substance suitable for a particular application as would be recognized by one having ordinary skill in the art.

In terms of operation, as shown in FIG. 8A electromagnets 652 and 654 are not energized and substance 660, which is shown as a liquid, has a center of gravity at a first location as shown by the arrow. As shown in FIG. 8B, when electromagnets 652 and 654 are energized by the controller, for example, substance 660 is attracted to electromagnets 652 and 654 and the center of gravity of the structure shifts rightward to a second location as shown by the arrow, causing system 600 to rotate in a clockwise direction. As system 600 rotates, paddles 680 displace liquid 690 causing system 600 to move along the surface of liquid 690 in the direction as shown by arrow 692.

Figure 9:
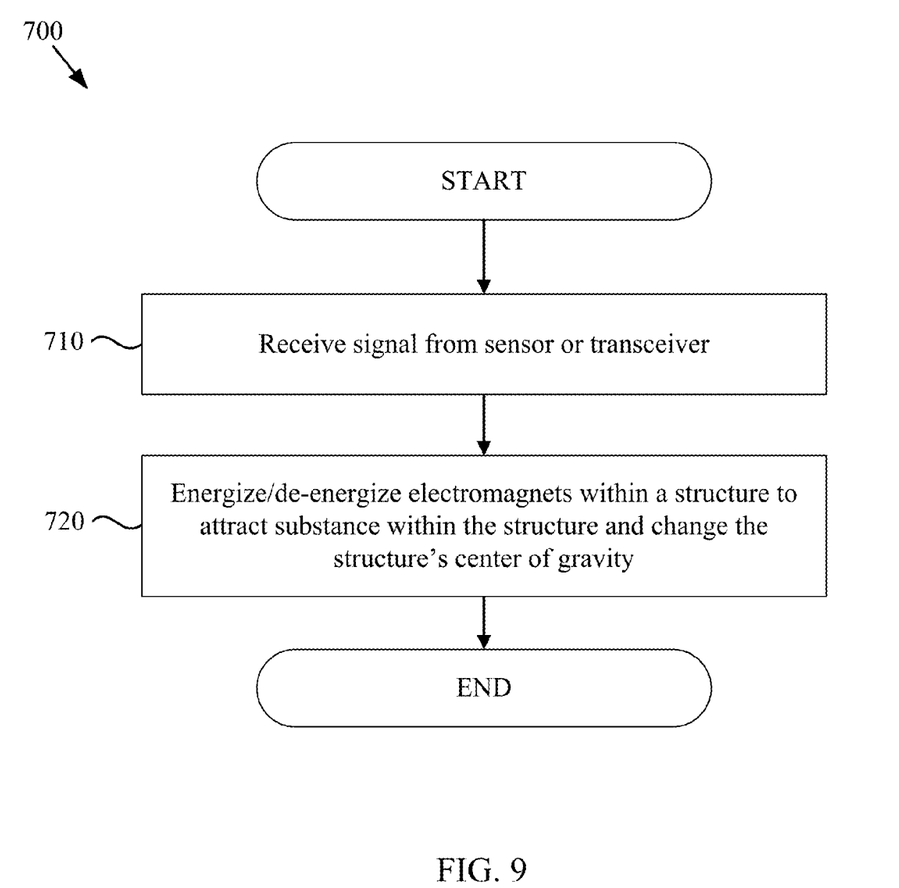
FIG. 9 shows a flowchart of an embodiment of a method in accordance with the System and Method for Electromagnetic-Based Propulsion.

FIG. 9 shows a flowchart of an embodiment of a method 700 in accordance with the System and Method for Electromagnetic-Based Propulsion. For illustrative purposes, system 700 will be discussed with reference to system 10 shown in FIG. 1, incorporating system 100 as shown in FIG. 2. However, method 700 may be performed by any of systems 10, 200, 300, 400, 500, and 600. Further, while FIG. 9 shows one embodiment of method 700 to include steps 710-720, other embodiments of method 700 may contain fewer or more steps. Further, while in some embodiments the steps of method 700 may be performed as shown in FIG. 9, in other embodiments the steps may be performed in a different order, or certain steps may occur simultaneously with one or more other steps.

Method 700 begins with step 710, which involves receiving, such as at controller 120, a signal from a sensor 170, 180, or 190 or a transceiver 160. Step 720 then involves energizing one or more electromagnets 62 and 64 of a plurality of electromagnets 60 contained within and fixedly distributed about a first region 40 of a structure 10 to attract a substance 70 contained and movable within a second region 50 of the structure 10 to the energized electromagnets 62 and 64 and change the center of gravity of the structure 10. In some embodiments, step 720 involves energizing and de-energizing electromagnets 60 in a sequence to cause structure 10 to roll across a surface 90. In some embodiments, step 720 involves energizing and de-energizing electromagnets 60 in a sequence to cause structure 10 to vibrate about a position on a surface 90.

Many modifications and variations of the System and Method for Electromagnetic-Based Propulsion are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the step of:
energizing one or more of a plurality of electromagnets contained within and fixedly distributed about a first region of a structure to attract a substance contained and movable within a second region of the structure to the energized electromagnets and change the center of gravity of the structure, wherein the substance is selected from the group of substances consisting of a magnetic substance and a magnetizable substance.

2. The method of claim 1, wherein the structure is a spherical structure and is disposed on a surface, wherein the step of energizing one or more of a plurality of electromagnets causes the spherical structure to roll over the surface in a desired direction.

3. The method of claim 1, wherein the step of energizing one or more of a plurality of electromagnets is performed by a controller operatively coupled to each of the electromagnets.

4. The method of claim 3, wherein the step of energizing one or more of a plurality of electromagnets is performed by the controller responsive to a signal received from at least one sensor operatively connected to the controller.

5. The method of claim 3, wherein the step of energizing one or more of a plurality of electromagnets is performed by the controller responsive to a signal received from a transceiver operatively connected to the controller.

6. The method of claim 1, wherein the first region is physically separated from the second region.

7. The method of claim 1, wherein the structure comprises a rigid material.

8. A method comprising the step of:
energizing one or more of a plurality of electromagnets contained within and fixedly distributed about a first region of a rigid structure and de-energizing one or more other of the plurality of electromagnets to attract a substance contained and movable within a second region of the rigid structure to the energized electromagnets and change the center of gravity of the rigid structure, wherein the first region is physically separated from the second region, wherein the substance is selected from the group of substances consisting of a magnetic substance and a magnetizable substance.

9. The method of claim 8, wherein the rigid structure is a rigid spherical structure and is disposed on a surface, wherein the step of energizing one or more of a plurality of electromagnets and de-energizing one or more other of the plurality of electromagnets comprises energizing and de-energizing the electromagnets in a sequence to cause the rigid spherical structure to roll over the surface in a desired direction.

10. The method of claim 8, wherein the rigid structure is a rigid spherical structure and is disposed on a surface, wherein the step of energizing one or more of a plurality of electromagnets and de-energizing one or more other of the plurality of electromagnets comprises energizing and de-energizing the electromagnets in a sequence to cause the rigid spherical structure to vibrate about a position on the surface.

11. The method of claim 8, wherein the step of energizing one or more of a plurality of electromagnets and de-energizing one or more other of the plurality of electromagnets is performed by a controller operatively coupled to each of the electromagnets responsive to a received signal from one of a sensor operatively connected to the controller and a transceiver operatively connected to the controller.

12. A system comprising:
a structure comprising an outer shell and an inner shell, the space between the outer shell and the inner shell defining a first region and the space within the inner shell defining a second region;
a plurality of electromagnets contained within and fixedly distributed about the first region;
a controller operatively coupled to each of the electromagnets; and
a substance contained within the second region, wherein the controller is configured to energize one or more of the plurality of electromagnets and de-energize one or more other of the plurality of electromagnets to attract the substance to the energized electromagnets and change the center of gravity of the structure, wherein the substance is selected from the group of substances consisting of a magnetic substance and a magnetizable substance.

13. The system of claim 12 further comprising at least one sensor operatively connected to the controller, wherein the controller is configured to energize and de-energize the electromagnets in response to a signal received from the sensor.

14. The system of claim 12 further comprising a transceiver operatively connected to the controller, wherein the controller is configured to energize and de-energize the electromagnets in response to a signal received from the transceiver.

15. The system of claim 12 further comprising a control shell centrally located within the second region, the control shell connected to the inner shell by a plurality of hollow tubes extending from the control shell to each of the electromagnets, the control shell containing the controller within, each electromagnet connected to the controller via an electrical connection through one of the spokes through the control shell to the controller.

16. The system of claim 12, wherein the plurality of electromagnets comprise a first group of electromagnets coupled to the outer shell and a second group of electromagnets coupled to the inner shell, wherein the controller is configured to energize and de-energize one or more of the first group of electromagnets to attract the energized first group of electromagnets to a surface and further configured to energize and de-energize one or more of the second group of electromagnets to attract the substance to the energized second group of electromagnets.

17. The system of claim 12, wherein the structure is contained within a hollow ferrite shell having a diameter at least twice the size of the diameter of the structure.

18. The system of claim 12 further comprising more than one paddles extending from the surface of the outer shell.

* * * * *